Patented Aug. 26, 1941

2,253,681

UNITED STATES PATENT OFFICE 2,253,681

ESTER COMPLEXES AND PROCESS OF PRODUCING SAME

Theodore F. Bradley and William B. Johnston, Stamford, Conn., assignors to American Cyanamid Company, New York, N. Y., a corporation of Maine No Drawing. Application April 5, 1939, Serial No. 266,132

21 Claims. (Cl. 260—22)

This invention relates to mixed esters and to methods of producing same. It is particularly concerned with esters which may be described as esters of conjugated terpene-fumaric acid complexes and methods of producing the same.

This application is a continuation in part of our copending applications Serial Nos. 215,584 and 242,556, filed June 24, 1938, and November 26, 1938, respectively, now Patent Nos. 2,235,447 and 2,234,958.

An object of the present invention is to produce a new series of derivatives of conjugated terpene hydrocarbons which will be suitable for many industrial purposes.

Another object of the present invention is to provide a process by which the materials employed may be readily and efficiently reacted to produce directly an alkyd-polyester mixture relatively free from undesirable polybasic components.

These and other objects are attained by causing the fumaric acid to combine with conjugated terpenes of the $C_{10}H_{16}$ series using solubilizing and reactive alcohols to produce esters of complex organic acids which are formed during reactions that apparently involve the unsaturation of both the terpenes and the fumaric acid and are produced solely as esterified derivatives by our methods as hereinafter described. We have found that if fumaric acid be admixed with an alcohol and one or more conjugated terpenes of the $C_{10}H_{16}$ group and the mixture be caused to react simultaneously there results chemical interaction of the fumaric acid, terpene and alcohol, and esters of relatively low acid number are formed in high yields without objectionable side reactions or decompositions.

The principles and practice of our invention will be more clearly understood by reference to the examples given by way of illustration and not in limitation. In each of the following examples the stipulated amounts of conjugated terpene, alcohol and fumaric acid are placed in a suitable reaction vessel. A suitable reflux condenser and a water trap are preferably attached to the reaction vessel. The mixture is agitated by any suitable means during the heating operation and the temperature of the reaction mixture is held continuously at the reflux point so that the excess of unreacted terpene and the water of esterification are distilled together, condensed and separated, and the separated terpene is returned to the reaction mixture.

In general, the reaction mixture is heated to about 170° C. and is then gradually raised to from about 180° C. to about 210° C.

The exact temperatures used in each specific case, however, are initially subject to the boiling points of the reacting materials but gradually increase as the water of esterification is eliminated. In all cases the reaction mixtures are best refluxed until substantially all water evolution has ceased. Following this the excess or unreacted terpene is removed under reduced pressure and the resulting esters are recovered for subsequent use.

Example 1

Parts by weight

Fumaric acid_____ 78
Diethylene glycol_____ 71
Alpha phellandrene_____ 125

This mixture is heated, refluxed and agitated for a period of about three to four hours at about 200°–210° C. A somewhat viscous, light-colored, balsam-like polyester resin of relatively low acid number is obtained having about 0.9 mol of terpene combined per mol of fumaric acid.

Example 2

Parts by weight

Fumaric acid_____ 58
Triethylene glycol_____ 75
Alpha terpinene_____ 100

This composition is heated and refluxed with agitation for about four to seven hours at about 175° C. A light-colored, balsam-like polyester resin is obtained having about 0.7 mol of terpene combined per mol of fumaric acid. This resin is usually less viscous than that obtained in accordance with Example 1.

Example 3

Parts by weight

Fumaric acid_____ 116
Triethylene glycol_____ 150
$\Delta^{3,8(9)}$ p-menthadiene_____ 150

This mixture is placed in a suitable reaction chamber provided with an agitator and is heated at about 175°–210° C. under reflux for about four to eight hours. A light-colored, balsam-like resin is obtained having about 0.5–0.9 mol of terpene combined per mol of fumaric acid.

Other alcohols may be substituted for those used in the above examples such as amyl alcohol, octadecanediol, n-butanol, glycerol, polyglycerol, monoaryl or alkyl ethers of glycerol, polyglycols or other suitable glycols. The reactive solubilizing alcohols suitable for the practice of this invention are those which contain non-acidic primary or secondary hydroxyl groups which are generally capable of esterification. Various mixtures of alcohols may be used, especially mixtures of alcohols containing different numbers of hydroxyl groups, e. g. monohydric alcohol with a dihydric alcohol, a mono- or dihydric alcohol with a higher polyhydric alcohol such as glycerol, etc. Monohydric alcohols alone generally yield liquid esters of varying boiling range while the polyhydric alcohols generally yield balsam-like or solid resins.

The higher polyhydric alcohols i. e. those containing three or more hydroxyl groups tend to react with the fumaric acid to yield insoluble gels without effecting sufficient combination of the terpenes. This tendency may be largely overcome by the use of an excess of the alcohol, by the use of suitable catalysts and by carefully controlling the temperature to avoid overheating, particularly in the early stage of the reaction. The temperature should be raised only very slowly to about 170°–180° C. After the reaction has proceeded until the mixture is clear, the reaction temperature may be raised to 180°–200° C. With the higher temperatures, however, premature gelation is most likely to occur.

Characteristic of the products of this invention is the substantial absence of esters of acids having a polybasicity greater than two, wherefore the viscosities and softening points tend to be lower than the esters prepared from the maleic-terpene adducts of the prior art. Such differences may be attributable to the absence of such substantial amounts of polymeric polycarboxylic acids as have been found to characterize the terpene-maleic adducts of the prior art.

By suitable regulation of the reaction conditions we may vary the combining ratio of terpene to fumaric acid and consequently of the proportion the various esters produced within considerable limits and by varying the solubilizing and reactive alcohols used we can produce a large number of new and useful derivatives.

To obtain products of particularly high commercial utility, we have found it desirable to modify some of the compositions and especially the glycerol-fumaric-terpene products in various ways in order to obtain resins having certain valuable properties. In general our terpene resins are more soluble in hydrocarbons than the phthalic type of alkyd resins. By slight modification of our resins it is possible to obtain resins having a high degree of oil solubility, quick air drying properties, etc. One way of obtaining improved or soluble resins is to incorporate small amounts of fatty oil acids in the composition after the initial reaction of the mixture including an alcohol (e. g. glycerol), terpene and fumaric acid. After this initial reaction has taken place, i. e. when the reaction mixture becomes clear, about 20% or more of fatty oil acids (calculated as triglyceride), e. g. linseed oil acids, are added to the mixture. It is especially important that the fumaric acid, alcohol and terpene should be combined before the addition of any conjugated fatty oil acids in order to avoid reaction between the fumaric acid and the conjugated fatty oil acids before the alcohol and terpene have had sufficient time to combine. It has been found advantageous in some cases to preheat the fatty oil acids before adding them to the reaction mixture.

If more than 20% of fatty oil be desired in the final product it may be added during the latter stages of reaction in the form of either fatty oil acids or as the oil itself, as desired. Since the oil is less expensive than the acids it is usually preferable to add the oil itself rather than the acids. The addition of about 20% of fatty oil acids (calculated as triglyceride) in the early stage of the reaction, as described, causes the composition to become miscible with additional oil upon further reaction. Accordingly large amounts of the corresponding fatty oil or other fatty oils may be added to the composition if the temperature be kept relatively high e. g. about 170° C.

When the resin is to be modified with fatty oil acids, additional alcohol, equivalent to the fatty oil acids to be added, is usually added to the original mixture of fumaric acid, terpene and alcohol.

The following example illustrates one method of modifying our polyester resins as described above.

*Example 4*

| | Parts by weight |
|---|---|
| Fumaric acid | 58 |
| Triethylene glycol | 75 |
| Alpha terpinene | 100 |
| Glycerol | 5 |

In the first stage of the reaction this composition is heated under reflux in a suitable reaction chamber provided with an agitator at about 170° C. The mixture is heated until the reaction mixture becomes clear.

After this initial reaction the second stage of the reaction is begun at which time fatty oil acids may be added. Accordingly about 45 parts by weight of linseed oil fatty acids (alone or mixed with a solvent) which have been preheated to about 170° C. are added slowly to the reaction mixture. This quantity of fatty acids is equivalent to about 20% of linseed oil. The reaction is continued at about 170°–210° C. for three to four hours, yielding a balsam-like polyester resin having a relatively low acid number.

If it be desirable to incorporate more than about 20% of fatty oil or fatty oil acids, the additional amount may be added at this stage of the reaction. Accordingly about 45 parts by weight of linseed oil may be added to the polyester resin obtained above, the temperature of both the fatty oil and the polyester resin being maintained at about 170°–180° C. to give a homogeneous balsam-like product particularly suitable for use in coating compositions.

Our resins may be modified with any of the fatty oils. Examples of suitable fatty oils are: tung, soya bean, perilla, grapeseed, cottonseed, olein, stearin, etc. It may be desirable to modify the resin with drying oil, particularly if the resin is to be used in air drying coating compositions. For this purpose we have found that linseed oil and linseed oil fatty acids are especially suitable. The term "drying oil" is intended to include semi-drying oils as well as the strictly drying oils. Obviously various mixtures of fatty oils or fatty oil acids may be used. The resins produced by modification with fatty oils are usually quite soluble in hydrocarbon solvents. They are, therefore, particularly suitable for use in enamels, varnishes, lacquers, etc.

Another way in which the compositions of our invention may be modified in order to obtain oil-soluble products is by the addition of such substances as rosin acids, benzoic acid, etc., to the reaction mixture. If a conjugated compound such as rosin be used, this addition is preferably made after all, or nearly all of the terpene has combined with the fumaric acid and alcohol as otherwise the modifying substance may combine with the fumaric acid before the latter has had time to combine with the terpene.

In operating our process, we have found it advisable, although not essential to employ sufficient excess of the terpene over the combining equivalent for the fumaric acid so that this excess of terpene during its volatilization may act mechanically and perhaps azeotropically to assist in the removal of the water of esterification and so promote the esterification reaction. When operating in this manner, the reaction vessel is best equipped with a suitable reflux condenser and water trap arranged so that the condensing vapors may be separated continuously, the water retained or separated and the excess terpene returned to the system until the desired degree of addition reaction and of esterification have been attained.

In the operation of our process it is sometimes possible and advantageous to employ inert volatile diluents for the reaction mixture. Among materials suitable for this purpose may be mentioned benzene, toluene, xylene, ethylene dichloride or the like in place of an excess of terpene. These diluents may be removed from the product by distillation or if desirable the compatible diluents may be left with the resin as solvents.

We have also found it possible to substitute a part of our terpenes with a corresponding amount of reactive non-terpene hydrocarbons and other volatile and polymerizable unsaturated bodies as, for example, styrene, dicyclopentadiene, cumarone, indene and certain vinyl, acrylic and methacrylic esters.

In order to obtain a high ratio of terpene combined with the alcohol and fumaric acid it is desirable to employ an excess of terpene and/or a catalyst. Suitable catalysts are included in the group of the halogens, hydrogen halides or metallic halides. Of the various catalysts which have been found to catalyze these reactions stannic chloride, stannic chloride-dioxanate and the sulfonic acids, e. g., p-toluene sulfonic acid, are particularly suitable.

When dihydric alcohols are used in the practice of our invention we prefer to employ only the theoretical equivalent of alcohol based on the amount of fumaric acid used, although the use of lesser or greater amounts is permissible. With monohydric alcohols or those containing more than two hydroxyl groups are used, then we usually prefer to use an excess of the alcohol. An excess of about 20% has been found suitable when glycerol is used. The amount of alcohol used depends somewhat on the properties desired in the resulting resin.

Terpenes suitable for the purpose of this invention are limited to those of the $C_{10}H_{16}$ series which are of conjugated structure and among which alpha and beta phellandrenes, alpha terpinene, $\Delta^{3,8(9)}$ p-menthadiene, myrcene are particularly suitable. The use of commercial distillates containing mixtures of terpenes which are rich in any of the afore-mentioned conjugated terpenes may be used in place of the individual terpene. Furthermore mixtures of conjugated and non-conjugated terpenes of the $C_{10}H_{16}$ series, e. g., pinene may also be used. Among these there are a few commercial terpene distillates which contain essentially α terpinene, dipentene, or terpinolene and which have a boiling point of about 170°–185° C.

Products of this invention have been found to possess great utility. The liquid esters derived from monohydric alcohols may be used as plasticizers for nitrocellulose and in certain cases for ethyl cellulose or other cellulose esters or ethers. These esters may be hydrogenated to provide products suitable for the same purposes. Our resinous polyesters are also useful as resins or as plasticizers for cellulose derivatives, particularly nitrocellulose. Many of the polyesters, with or without fatty acid or drying oil modification, have been found to be oxygen convertible and of considerable utility in air drying or in stoving paints, varnishes and enamels.

Some of the products may be mixed with suitable fillers to produce linoleum and related plastics. Products of the present invention are also useful for printing or lithographing inks, gaskets, cements or adhesives and for general coating or impregnating purposes.

Such other suitable changes and variations may be made in carrying out our process without departing from the spirit and scope of our invention as defined in the appended claims.

We claim:

1. A process for the production of ester condensation products which comprises heating to reaction temperatures a mixture containing fumaric acid, a conjugated terpene of the $C_{10}H_{16}$ series and a reactive solubilizing alcohol.

2. A process for the production of ester condensation products which comprises heating to reaction temperatures a mixture containing fumaric acid, a conjugated terpene of the $C_{10}H_{16}$ series and a reactive solubilizing alcohol, the temperature, time and other conditions being such as to bring about free and relatively continuous volatilization and removal of water of condensation in admixture with unreacted terpene.

3. A process for the production of ester condensation products which comprises heating to reaction temperatures a mixture containing fumaric acid, a conjugated terpene of the $C_{10}H_{16}$ series and a reactive solubilizing alcohol, the temperature, time and other conditions of reaction being such as to bring about free and relatively continuous volatilization and removal of water of condensation in admixture with unreacted terpene, separating the water from the admixture and returning the terpene to the reaction.

4. A process for the production of ester condensation products which comprises heating a mixture containing fumaric acid, a reactive solubilizing alcohol and a terpene distillate, the major portion of which consists of conjugated terpenes of the $C_{10}H_{16}$ series, said heating being continued at a temperature and for a time sufficient to bring about chemical combination of the mixture.

5. A process for the production of ester condensation products which comprises heating to reaction temperatures a mixture containing fumaric acid, a reactive solubilizing alcohol, and a conjugated terpene of the $C_{10}H_{16}$ series in the presence of a substance which catalyzes the reaction.

6. The process of claim 5 wherein the alcohol is a glycol.

7. A process for the production of ester condensation products which comprises heating to reaction temperatures a mixture containing fumaric acid, a conjugated terpene of the $C_{10}H_{16}$ series and a reactive solubilizing alcohol, continuing said heating until the reaction mixture becomes clear, adding a fatty oil acid and continuing said heating until a homogeneous product is obtained.

8. A process for the production of ester condensation products which comprises heating to reaction temperatures a mixture containing a conjugated terpene of the $C_{10}H_{16}$ series, a non-conjugated terpene of the $C_{10}H_{16}$ series, fumaric acid and a reactive solubilizing alcohol.

9. The simultaneous reaction product of a mixture containing fumaric acid, a conjugated terpene of the $C_{10}H_{16}$ series, and a glycol.

10. A simultaneous reaction product of fumaric acid, a conjugated terpene of the $C_{10}H_{16}$ series and an alcohol.

11. The simultaneous reaction product of a mixture containing fumaric acid, diethylene glycol and alpha phellandrene.

12. The simultaneous reaction product of a mixture containing fumaric acid, triethylene glycol and alpha terpinene.

13. The simultaneous reaction product of a mixture containing fumaric acid, triethylene glycol and $\Delta^{2,8(9)}$ p-menthadiene.

14. The simultaneous reaction product of a mixture containing fumaric acid, an alcohol and a conjugated terpene of the $C_{10}H_{16}$ series modified with at least one substance selected from the group consisting of fatty oil acids and fatty oils.

15. A process for the production of ester condensation products which comprises heating to reaction temperature a mixture containing fumaric acid, a conjugated terpene of the $C_{10}H_{16}$ series and a reactive solubilizing alcohol, continuing said heating until the reaction mixture becomes clear, adding a fatty oil acid, continuing said heating until the homogeneous product is obtained, adding a fatty oil and continuing said heating until a homogeneous product is again obtained.

16. The simultaneous reaction product of a mixture containing fumaric acid, an alcohol and a conjugated terpene of the $C_{10}H_{16}$ series modified with drying oil fatty acids.

17. The simultaneous reaction product of a mixture containing fumaric acid, an alcohol and a conjugated terpene of the $C_{10}H_{16}$ series modified with drying oils.

18. The simultaneous reaction product of a mixture containing fumaric acid, an alcohol and a conjugated terpene of the $C_{10}H_{16}$ series modified with a mixture of drying oil fatty acids and drying oils.

19. The process of claim 5 wherein the substance which catalyzes the reaction is stannic chloride.

20. The process of claim 5 wherein the substance which catalyzes the reaction is stannic chloride dioxanate.

21. The process of claim 5 wherein the substance which catalyzes the reaction is p-toluene sulfonic acid.

THEODORE F. BRADLEY.
WILLIAM B. JOHNSTON.